United States Patent
Maillaro

(10) Patent No.: US 6,186,450 B1
(45) Date of Patent: Feb. 13, 2001

(54) PERIPHERAL INTERFACE CABLE SUPPORT

(76) Inventor: Felix J. Maillaro, 15 Canterbury La., Suffern, NY (US) 10901-3511

(*) Notice: Under 35 U.S.C. 154(b), the term of this patent shall be extended for 0 days.

(21) Appl. No.: 09/063,218

(22) Filed: Apr. 20, 1998

(51) Int. Cl.[7] ........................................................ F16L 3/00
(52) U.S. Cl. ................................ 248/51; 248/52; 248/918
(58) Field of Search ................................. 248/51, 52, 918, 248/125.7; 38/142; 174/135, 69; 362/382, 418, 427, 429

(56) References Cited

U.S. PATENT DOCUMENTS

| | | | |
|---|---|---|---|
| 2,144,272 | * 1/1939 | Ray | 248/51 |
| 4,702,443 | * 10/1987 | Callaway | 248/51 |
| 5,313,910 | * 5/1994 | Wittman | 119/57.9 |
| 5,398,895 | * 3/1995 | Whetherhult | 248/51 |

* cited by examiner

Primary Examiner—Ramon O. Ramirez
Assistant Examiner—Jerome DeLuca
(74) Attorney, Agent, or Firm—Goldstein & Canino

(57) ABSTRACT

An interface cable support arrangement to assist in the unimpeded operation of a user hand-operated input device connected to a computer system by an interface cable. A base is included having a sufficient mass to provide stability even when a supported interface cable of the input device is moved by the user within a predefined limited region or area. A support rod having a curved upper section is rotatably mounted on the base to enable the support rod to swivel, as required, with the motion of the interface cable as the input device is operated by the user.

4 Claims, 3 Drawing Sheets

PERIPHERAL INTERFACE CABLE SUPPORT

BACKGROUND OF THE INVENTION

1. Field of the Invention

The invention relates to cable supporting and guiding structures. More particularly, the present invention provides cable support arrangements that may be used with personal computer interface cables from input devices such as a computer mouse, joystick, or track-ball unit.

2. Background and Objects of the Invention

The use of personal computers has become common place in both residential and commercial settings. The personal computer (PC) will typically include a number of input devices, which are more generally referred to as peripheral devices, that are operatively coupled to the PC by way of interface cables. These devices include the common computer mouse and keyboard, as well as other devices such as microphones, speakers, touch pads, scanners, printers, etc. Each device may require its interface cable to be passed though a 'cable port' located on the top surface of a desk or table, or down the back of the desk or table. Often, due to gravity these cables may to exert a force or maintain tension (via the interface cable) on the respective devices. When the device is a mouse or joystick the tension established by the interface cable can be annoying or even inhibit the proper or smooth operation of the input device.

There are a number of cable supporting devices known in the art. One representative example is provided by U.S. Pat. No. 5,398,895 to Whetherhult et al. This device, which is described as a "cable holder and support device", includes a weighted base unit and a helical spring having a vertical orientation that is mounted to an upper portion of the base unit. The Whetherhult device is only capable of supporting a single cable, and makes no provisions for securing and or constraining other (peripheral or input) device cables. The Whetherhult device disclosed is also somewhat unsightly for an office or corporate environment, and would require the interface cable to be hand rotated through the entire length of the spring. Further, the spring and structures associated with the spring may be expensive to manufacture. As can be clearly seen in FIGS. 1 and 7 of Whetherhult, this device is intended to be fixed to a supporting surface, with the base design requiring specific structures to support this feature.

A second prior art cord holding device is provided by U.S. Pat. No. 1,493,799 to Blei. The Blei invention is essentially a tall mast that is screwed into a supporting work surface and will flex when a cord supported thereby is pulled on. The Blei device is contemplated for use with hand-operated ironing devices. As such, it is structured to enable the iron to be operated within a very large predefined area. Due to its structure and configuration, the Blei device is not suitable to support the plurality of interface cables of a PC system, and would require modification to be used in the table or desktop manner in accordance with the present invention.

Accordingly, while the above-disclosed devices, and others known in the art, may be suitable for the particular purpose for which they were intended, or for a more general use, they would not be as suitable for the purposes contemplated for the present invention.

Objects of the present invention are, therefore, to provide new and improved cable supporting arrangements having one or more of the following capabilities, features, characteristics, and/or advantages:

simple and functional design;
provides a weighted table-top base with a 'position holding' mass (that does not need to be fixed to the table-top);
operatively supports an interface cable of a specific input device, such as a common computer mouse;
other device interface cables may be placed through or under a base unit to be quickly and conveniently constrained and/or secured thereby;
provides a rotatably mounted support rod that can swivel about the base;
aesthetic and simple structure;
base designs having small (base) footprint;
easy to configure and deploy; and
economical architecture and construction.

The above-listed objects, advantages, and associated novel features of the present invention, as well as others, will become clearer with a careful review of the description and figures provided herein. Attention is called to the fact, however, that the drawings and the associated description are illustrative only, and variations are certainly possible.

SUMMARY OF THE INVENTION

In accordance with the present invention, an interface cable support is provided to assist in the unimpeded operation of at least one user hand-operated input device. The interface cable support is contemplated in a preferred embodiment to be a table or desktop sitting unit that freely supports the use of an associated input device within a predefined limited area. For example, when considering the operation of an input device such as a common computer mouse, the predefined limited area may be a 24 centimeter by 20 centimeter location established by a mouse pad.

The interface cable support includes a base or base unit having a lower horizontal portion with a flattened bottom surface and an upper portion fixed to the lower horizontal portion. The lower portion is to be constructed to provide a significant amount of stability to the base and include a considerable portion of the base mass. An upper end of the upper portion is configured with a bore preferably having a substantially vertical orientation. A support rod extends above the base having a first end and a second end. The support rod is substantially curved at an upper section proximal to the second end. The curved upper section of the support rod may present a substantially hemispherical profile. The support rod is rotatably mounted to the base via the bore, so as to be able to swivel from side to side about the base at the first end.

The support rod may be arranged with a hook portion formed at the second end to securely hold a selected location along the length of the interface cable. The selected location is chosen so that a portion of the interface cable extending from the hook to the input device is of sufficient length to enable the easy and free motion of the input device within the predefined limited area. The support rod may also include a bushing and stop, both situated proximal to the first end, that enable the rotatable mounting of the support rod via the bore.

In a preferred embodiment of the interface cable support, the upper portion of the base is configured to include a plurality of vertical members fixed to the lower portion of the base at spaced locations thereabout, and establish openings through which at least one additional interface cable may pass in order to be constrained and/or securely supported by the cable support.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of many possible arrangements utilizing the fundamental concepts of the present invention. The drawings are briefly described as follows.

LIST OF REFERENCE NUMERALS USED IN THE DRAWINGS

10—(interface) cable support
12—interface cable
12a—other cables
16—(computer) input device or an equivalent
20—base or base unit
22—lower portion of base
24—(vertical) upper portion of base
24—(first) vertical member
24a—upper end of upper portion
26—groove
28—predefined limited area (exemplary)
30—support rod
30a—first end (of support rod)
30b—second end (of support rod)
32—cable hook
34—cable notch
36—stop
38—bushing
44—opening (for cables to pass through)
46—cable channel

DETAILED DESCRIPTION OF THE PREFERRED EMBODIMENTS

To ensure clarity in the description of the present invention, it is necessary to establish the definition of a number of important terms and/or expressions that will be used throughout this disclosure. The terms 'computer peripheral device', 'input device', and 'peripheral' are to be defined as any device that is external to a computer (i.e., the main unit or box) and operatively coupled thereto by an interface cable. The expression "predefined limited area" is to be defined as a somewhat restricted area or region proximal to a vicinity where the cable support device of the present is employed. The actual size of this area may vary with the particular input device that is supported with the cable support. When referring to the predefined limited area and the operation of the input device therein, the expressions 'freely supported' or 'freely supporting' may be assumed to indicate that the input device may be readily operated within the predefined limited area due to the support provided to the device's interface cable by the present invention. Another important computer term that is well understood by skilled persons is 'mouse', or equivalently the expression 'a common computer mouse'. These ubiquitous devices enable a (mouse) pointer to be moved about a display and typically include one to three momentary pushbuttons that may be pressed to select an item once the mouse pointer has been moved and located on top it. Finally, the terms 'interface cable support', 'cable support' and simply 'support' are to be considered synonymous. Other terms and expressions will be defined as needed.

Figure 1:
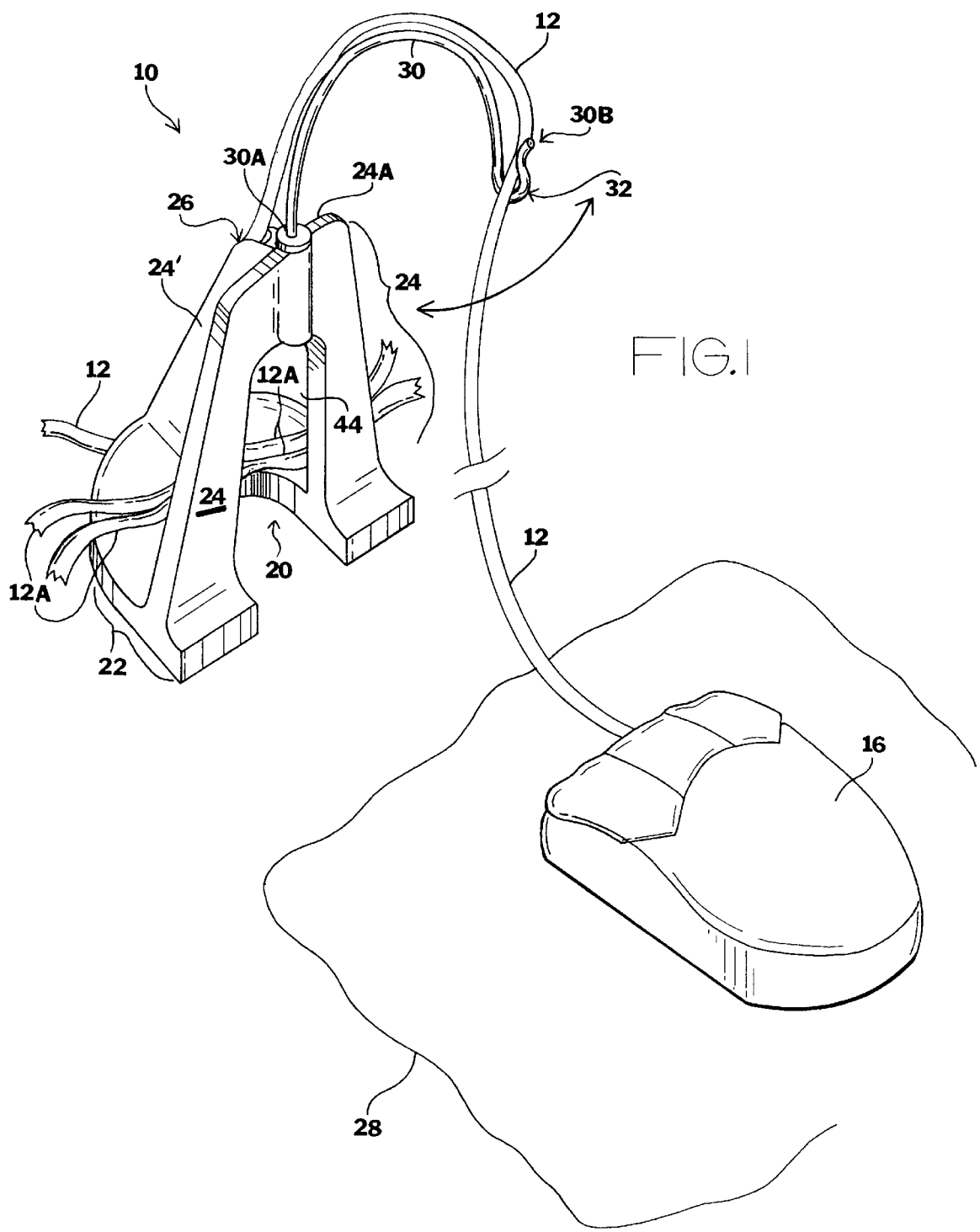
FIG. 1 provides a perspective view of an embodiment of the interface cable support supporting an interface cable of a common input device in accordance with the present invention.
Figure 2:
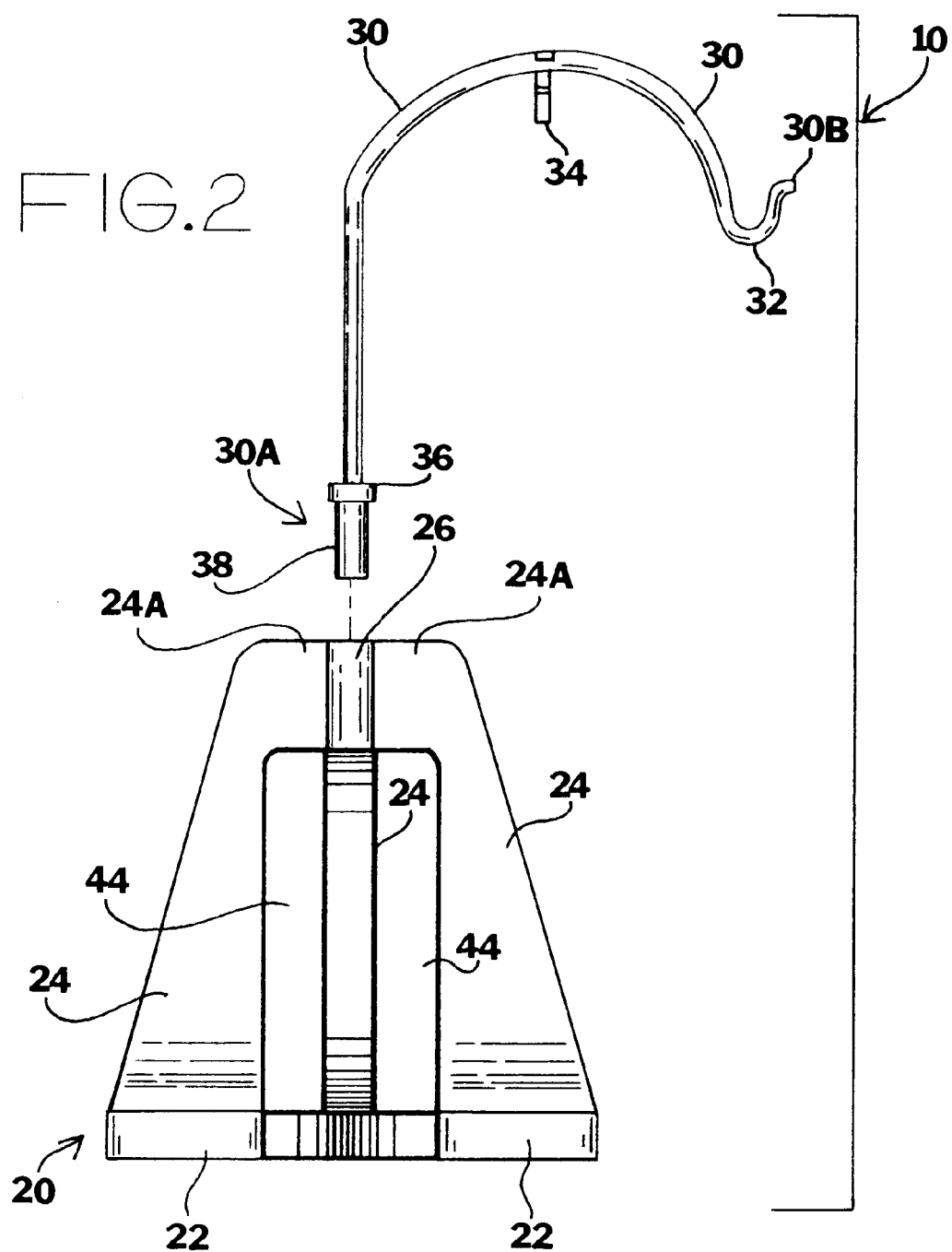
FIG. 2 depicts a front view of a base and a profile view of a support rod of an embodiment of the invention.
Figure 3:
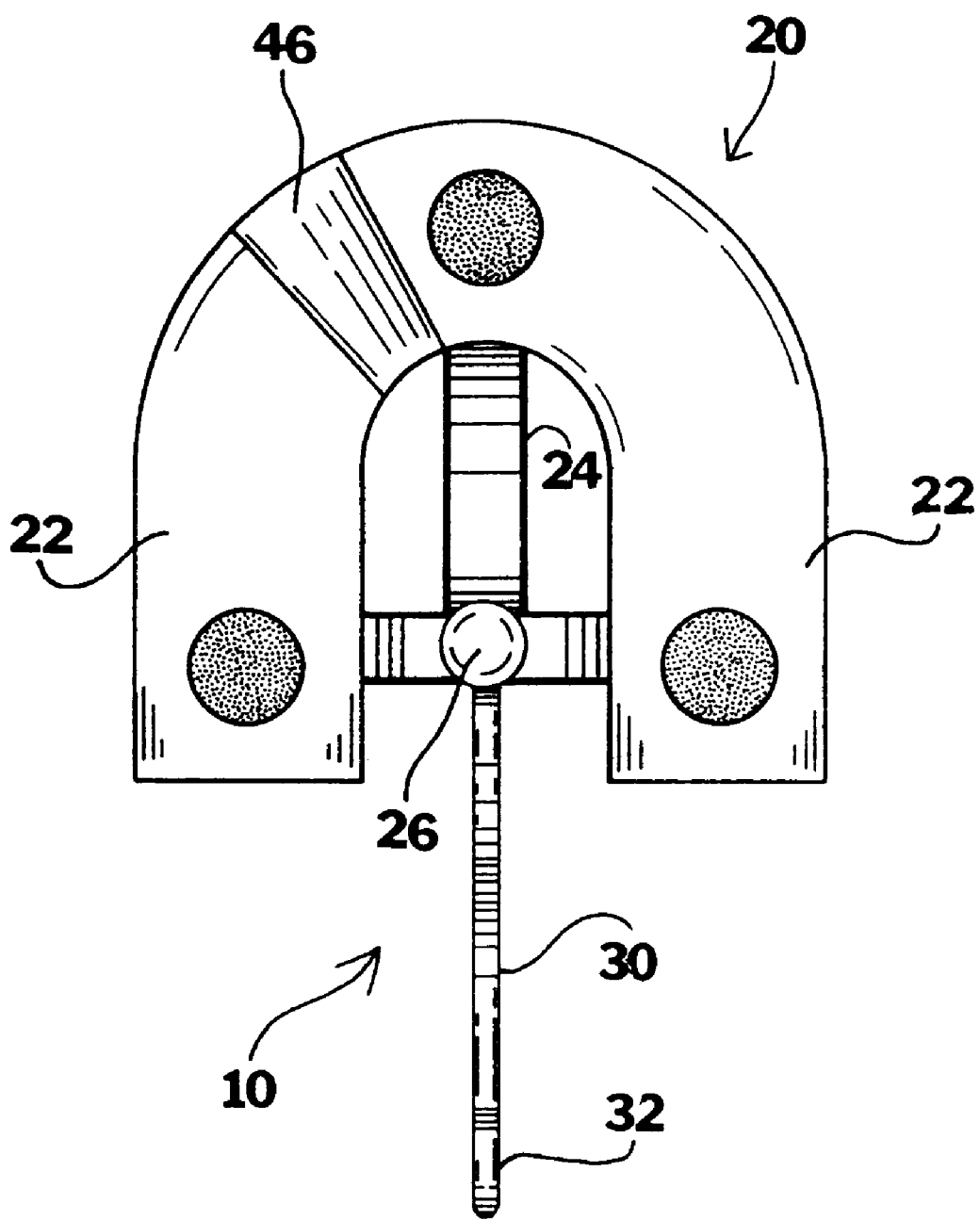
FIG. 3 illustrates a bottom view of the embodiments of FIG. 1 and FIG. 2.

Referring to FIG. 1 there is illustrated in a perspective view an embodiment of an interface cable support 10 to assist in the unimpeded operation of a user operated input device, for example the (computer mouse) input device 16, that is operatively coupled to a computer via interface cable 12. The computer is not explicitly illustrated. The cable support 10 is arranged to freely and flexibly support the interface cable 12 of the input device 16. Included is a base or base unit 20 having a horizontal lower portion 22 with a flattened bottom surface and a preferably vertically oriented upper portion 24 fixed to the lower portion 22. The upper portion 24 has an upper end 24a with a bore 26 therein. The bore 26 is seen in FIGS. 2 and 3. The base 20 is contemplated to be constructed having a sufficient mass (or equivalently, weight) that provides stability when located and sitting upon a table top or desk, even when the supported interface cable of the user input device is moved within the predefined limited area.

Also included is a support rod 30, which is best seen in FIGS. 1 and 2. The support rod 30 is located above and extends from the base 20, and has a first end 30a and a second end 30b. A substantially curved upper section of the support rod 30 presents a substantially hemispherical profile, with the curved upper section located proximal to the second end. The first end 30a of the support rod 30 is rotatably mounted via the bore 26 at the upper end of the upper portion 24 of the base 20. The support rod 30 may further include a cable hook 32, as shown in FIG. 2, that is formed at the second end 30b to securely hold a selected location along a length of the interface cable 12, as clearly seen in FIG. 1. The selected location along the length of the interface cable 12 is chosen so that a portion of the interface cable 12 extending from the cable hook 32 (FIG. 2) to the input device 16 is of sufficient length to enable free and easy motion of the input device within the predefined limited area. As shown in FIG. 2, at least one cable notch 34 may be formed in the curved upper section of the support rod 30 to enable the interface cable 12 to be supported at one or more additional locations along the curved upper section. The cable notch 34 or cable spring clip may be formed by a hair pin shaped bend in the support rod 30 to establish the cable notch 34 or cable spring clip with an opening having a width approximately matched to the interface cable's thickness to hold the interface cable 12 therein when inserted into the cable notch 34. Alternately, as skilled persons will appreciate, other arrangements may be provided to support the interface cable 12 and maintain a position following the curved section of the support rod 30. For example, one or more clips having a generally annular and or helical shape may be provided for such a purpose.

As shown in FIG. 1, the first end 30a of the support rod 30 may include a stop 36 (FIG. 2) and a bushing 38 (FIG. 2) or a shoulder bushing that will enable the support rod 30 to be rotatably mounted to the upper end 24a of the upper portion 24 of the base 20. The upper portion 24 of the base 20 may include a vertical member 24' having a groove 26 cut or formed therein, as can be seen in FIG. 1. The groove 26 extends substantially vertically from a location proximal to and behind the bore 26 (as illustrated in FIG. 1) to a location proximal to the lower portion 22 of the base 20. The groove 26 is provided to enable the interface cable 12 to be positioned and firmly held within the groove 26. The interface cable support 10 according to present invention may be arranged with a plurality of vertical members, such as 24', which are fixed the lower portion of the base at spaced locations to establish one or more openings 44. The openings 44 enable at least one additional interface cable 12a (as seen in FIG. 1) to pass through an opening in order to be constrained and secured thereby. This arrangement may enable cable from devices such as keyboards, keypads, touch pads, speakers, and others, to be organized, grouped and or generally constrained. As shown in FIG. 3, a cable channel 46 may be cut or formed into a flattened bottom surface of the lower portion 22. The cable channel 46 may be arranged to enable at least one other interface cable 12a from at least one other input device (not shown) to pass under the lower portion 22 of the base 20 and be constrained and secured by the lower portion 22 and a table or desk upon which the cable support 10 is situated. In a preferred embodiment, as clearly shown in FIGS. 1 and 3, the lower portion 22 may be provided with a semi-circular shape, and provide a substantial amount of the mass of the base.

It is important to understand that the above description of the embodiments of the interface cable support 10 of the present invention are exemplary only, and other equivalent arrangements are certainly possible. For example, as skilled persons would appreciate the base 20 of the present invention may be configured in a variety of other embodiments, while providing the fundamental functions described above. Therefore, while there have been described the currently preferred embodiments of the present invention, those skilled in the art will recognize that other and further modifications may be made without departing from the present invention, and it is intended to claim all modifications and variations as fall within the scope of the appended claims.

What is claimed is:

1. An interface cable support to assist in the unimpeded operation of at least one user-operated input device by freely supporting an interface cable of an input device, the interface cable support comprising:

a) a base including a horizontal lower portion with a flattened bottom surface and an upper portion fixed to the lower portion, an upper end of the upper portion provides a bore thereat; the base constructed having a mass that provides stability even when the input device connected to the supported interface cable is moved within a predefined limited area, wherein the upper portion of the base includes a first vertical member with a groove formed therein, the groove extending substantially vertically from a location proximal to the bore to a location proximal to the lower portion of the base and provided to enable the interface cable to be positioned and firmly held within the groove; and b) a support rod that that extends above the base having a first end and a second end, a substantially curved upper section of the support rod preferably with a hemispherical profile is located proximal to the second end, with the first end rotatably mounted via the bore to the upper end of the upper portion of the base;

c) the support rod further including a hook formed at the second end to securely hold a selected location along a length of the interface cable so that a portion of the interface cable extending from the hook to the input device is of sufficient length to enable the unimpeded motion of the input device within the predefined limited area.

2. The interface cable support according to claim 1, wherein the upper portion of the base includes a plurality of vertical members fixed to the lower portion of the base at spaced locations and establishing openings through which at least one additional interface cable may pass in order to be constrained and secured thereby.

3. The interface cable support according to claim 2, wherein the lower portion of the base includes at least one cable channel cut into the flattened bottom surface of the lower portion, the cable channel arranged to enable at least one other interface cable from at least one other input device to pass under the lower portion of the base and be constrained and secured by the lower portion of the base.

4. The interface cable support according to claim 3, wherein the lower portion of the base is arranged with a substantially semi-circular shape.

\* \* \* \* \*